US006985264B1

(12) United States Patent
Weidlich

(10) Patent No.: US 6,985,264 B1
(45) Date of Patent: Jan. 10, 2006

(54) METHOD FOR CALIBRATING AN ENGRAVING AMPLIFIER

(75) Inventor: Ermst-Rudolf Gottfried Weidlich, Kiel (DE)

(73) Assignee: Hell Gravure Systems GmbH, Kiel (DE)

(*) Notice: Subject to any disclaimer, the term of this patent is extended or adjusted under 35 U.S.C. 154(b) by 0 days.

(21) Appl. No.: 09/582,555

(22) PCT Filed: Jan. 15, 1999

(86) PCT No.: PCT/DE99/00052

§ 371 (c)(1),
(2), (4) Date: Aug. 10, 2000

(87) PCT Pub. No.: WO99/36265

PCT Pub. Date: Jul. 22, 1999

(30) Foreign Application Priority Data

Jan. 16, 1998 (DE) .................. 198 01 472

(51) Int. Cl.
*H04N 1/40* (2006.01)
(52) U.S. Cl. .............. 358/3.29; 358/296; 358/3.32
(58) Field of Classification Search .......... 358/3.29, 358/1.9, 3.3–3.32, 296–304
See application file for complete search history.

(56) References Cited

U.S. PATENT DOCUMENTS

| 3,893,166 A | | 7/1975 | Pugsley |
| 5,293,426 A | * | 3/1994 | Wouch et al. ............ 358/3.29 |
| 5,422,958 A | * | 6/1995 | Wouch et al. ............ 358/3.29 |
| 5,438,422 A | | 8/1995 | Holowko et al. |
| 5,818,605 A | * | 10/1998 | Crewe et al. ............. 358/3.29 |
| 5,831,746 A | | 11/1998 | Seitz et al. |
| 6,563,605 B1 | * | 5/2003 | Shively et al. ............ 358/3.29 |

FOREIGN PATENT DOCUMENTS

| DE | 0 595 324 | 4/1994 |
| DE | 197 17 990 | 11/1997 |
| WO | WO 96/26837 | 6/1996 |

* cited by examiner

*Primary Examiner*—Thomas D. Lee
*Assistant Examiner*—Stephen Brinich
(74) *Attorney, Agent, or Firm*—Schiff Hardin LLP

(57) ABSTRACT

In a method for calibrating an engraving amplifier in an electronic engraving machine, whereby a vibration signal is used to control the engraving of an engraving element by using engraving tone values representing desired tone values ranging from "light" to "dark", small cup shapes are engraved. The dimensions of the cup shapes define the real tone values. Transmission functions are initially determined, reproducing correlations between signal values that are adjusted in the engraving amplifier and the resulting changes in the real dimensions of the cup shapes. Sample cup shapes are engraved for predetermined desired tone values using the adjusted signal values for at least one of the parameters such as "vibration", "light", "dark" or "mid tone". Differential values are obtained from real measured dimensions and the predetermined desired dimensions of the sample cup shapes, taking into account the transmission functions, whereby the differential values are used to correct the adjusted signal values. Operations are repeated using the corrected signal values until the real dimensions of the engraved cup shapes correspond to at least a permissible variation of the desired dimensions.

9 Claims, 1 Drawing Sheet

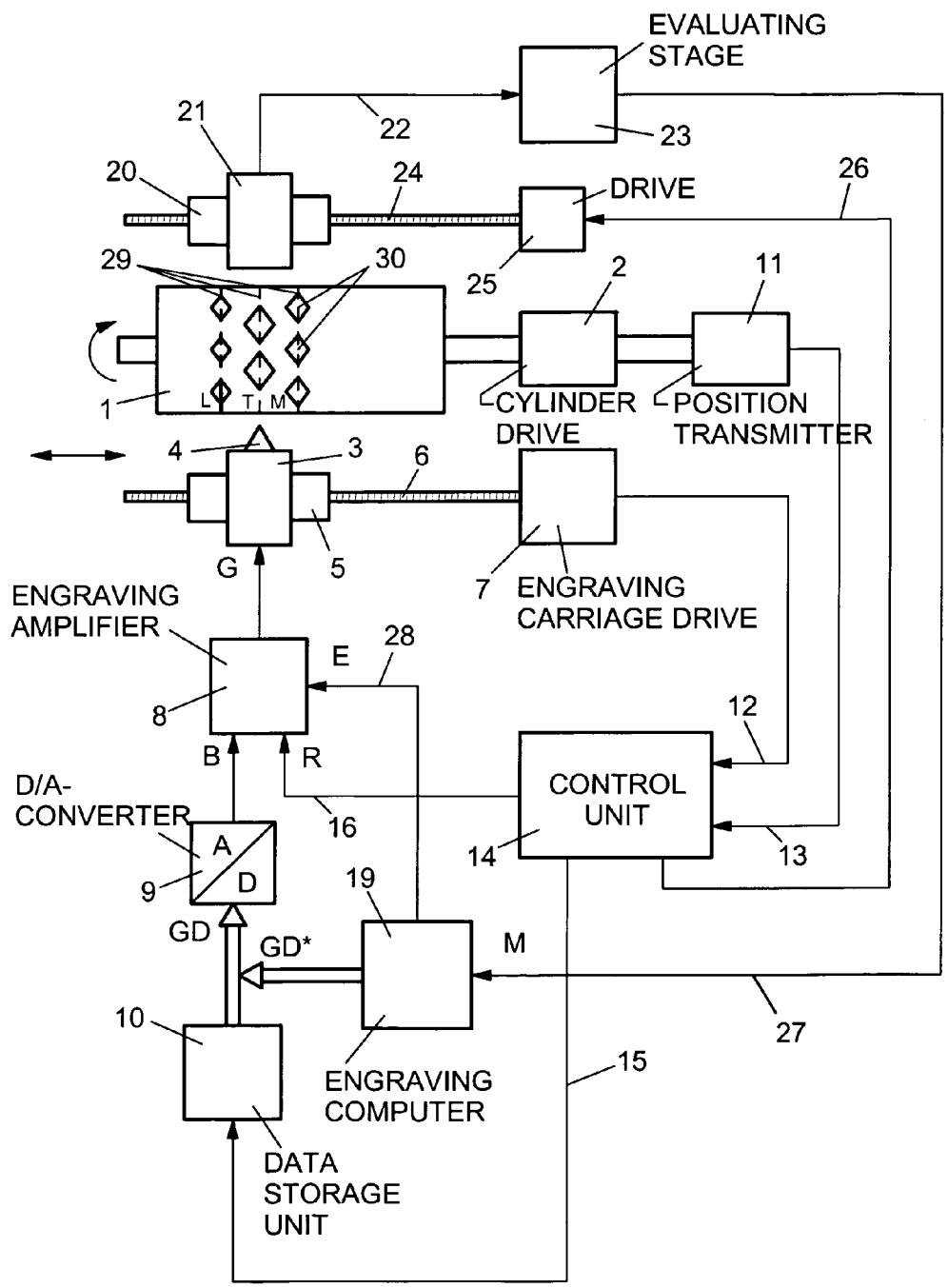

METHOD FOR CALIBRATING AN ENGRAVING AMPLIFIER

BACKGROUND OF THE INVENTION

The disclosure relates to the field of electronic reproduction technology and relates to a method for calibrating an engraving amplifier in an electronic engraving machine for engraving printing cylinders for gravure printing.

In an electronic engraving machine, an engraving member with an engraving stylus as a cutting tool moves at a rotating printing cylinder in the axial direction. The engraving stylus, which is controlled by an engraving signal, cuts a series of cells into the surface of the printing cylinder. The engraving signal is formed in an engraving amplifier by superimposing image signal values with a periodic vibration signal. While the vibration signal effects an oscillating lifting motion of the engraving stylus for the purpose of generating the engraving raster, the image values which represent the tone values between "light" and "dark" which are to be reproduced determine the geometric dimensions of the engraved cells.

So that the cells that are engraved on the printing cylinder have the desired tone values as prescribed by the image signal values, a calibration of the engraving amplifier is performed. For this purpose, in a test engraving process test cells are engraved for prescribed desired tone values, for instance for the desired tone values "light", "dark" and "middle tone". After the test engraving, the geometric actual dimensions of the engraved test cells are measured out and compared to the corresponding desired dimensions. Settings are calculated from the comparison of the geometric dimensions, with which settings the engraving signal is calibrated such that the geometric dimensions of the cells that are actually created in the engraving correspond to the geometric dimensions required for an engraving with the correct tone values.

In conventional calibration of an engraving amplifier of an engraving machine, the settings are prescribed, the geometric dimensions of the test cells that are engraved in test engravings are measured out, and the new settings are calculated with the aid of the measurement results essentially manually, with the setting processes and subsequent test engravings being continued until an optimal calibration is reached. A disadvantage of the conventional procedure is that the operator must have practical experience concerning the relationships between the electrical setting points and the actual geometric dimensions, which are to be expected, of the test cells, whereby numerous parameters and marginal conditions must be accounted for, such as the transmission behavior of the engraving amplifier and the engraving member, the cut angle and the degree of wear of the engraving stylus, as well as the material hardness of the surface of the printing cylinder that is to be engraved.

EP 0 595 324 A already reaches a method for calibrating an engraving amplifier of an engraving machine in which signal values for modifying at least one parameter "vibration", "light", "dark", or "medium gradation" are set at the engraving amplifier, a test engraving is performed using the adjusted signal values, the actual dimensions of the engraved test cells are measured out, and, from the measured actual dimensions and the predetermined desired dimensions, difference values with which the signal values are corrected are calculated upon consideration of previously calculated transmission functions, with the individual steps being repeated in a routine using the respectively corrected signal values until the actual dimensions of the engraved test cells are within a tolerance range.

A similar method for calibrating an engraving amplifier of an engraving machine is known from U.S. Pat. No. 5,438,422 A.

The known methods have the disadvantage that optimal calibration requires a relatively long time, since a new test engraving must always be conducted in the repetitions of the steps.

SUMMARY OF THE INVENTION

It is thus an object of the invention to improve a method for calibrating an engraving amplifier in an electronic engraving machine so as to shorten the time required for calibration, and to guarantee an automatic and optimal course of calibration to the greatest extent possible, without knowledge of the individual transmission functions and marginal conditions.

According to the present invention, a method is provided for calibrating an engraving amplifier in an electronic engraving machine for engraving printing cylinders for gravure printing. An engraving signal for actuating an engraving stylus of an engraving member is acquired from engraving values representing desired tone values and a periodic vibration signal in an engraving amplifier that can be adjusted by signal values for generating an engraving raster. With the engraving stylus, cells are engraved into the printing cylinder, the actual dimensions of the cells representing engraved actual tone values. Transmission functions are calculated which reproduce relationships between variations, which are adjusted at the engraving amplifier, of the signal values, and the resulting variations of the geometric actual dimensions of the engraved cells. Signal values for modifying at least one parameter "vibration", "light", "dark", or "medium gradation" are set at the engraving amplifier. With the signal values, test cells are engraved for predetermined desired tone values, and their geometric actual dimensions are measured. Difference values are calculated from the actual dimensions and the desired dimensions of the cells upon consideration of the transmission functions. The signal values are corrected by adding the difference values. The steps of setting the signal values through correcting the signal values are repeated using the corrected signal values until the actual dimensions of the cells are at least within a tolerance range about the desired dimensions. To shorten the calibration time, in each sequence of the steps from setting the signal values through the correcting of the signal values, the actual dimensions of the cells are compared to the desired dimensions. If the actual dimensions are outside the tolerance range, transmission functions are recalculated. The difference values are computed upon consideration of the recalculated transmission functions. The signal values are corrected using the new difference values.

BRIEF DESCRIPTION OF THE DRAWINGS

The drawing FIGURE is a block diagram of a preferred embodiment of the electronic engraving machine of the invention.

DESCRIPTION OF THE PREFERRED EMBODIMENT

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

The preferred embodiment is detailed below with the aid of the FIGURE, which represents a principal exemplifying embodiment for an electronic engraving machine for engraving printing cylinders for gravure printing. The engraving machine is a HelioKlischograph® by Hell Gravure Systems GmbH, Kiel, DE.

A printing cylinder 1 is driven to rotate by a cylinder drive 2. The engraving on the printing cylinder 1 is accomplished with the aid of an engraving member 3, which comprises an engraving stylus 4 as a cutting tool.

The engraving member 3 is located on an engraving carriage 5, which is moved with the aid of a spindle 6 by an engraving carriage drive 7 in the axial direction of the printing cylinder 1.

The engraving stylus 4 of the engraving member 3 cuts a series of cells that are arranged in an engraving raster line by line into the surface of the rotating printing cylinder 1, while the engraving carriage 5 with the engraving member 3 moves axially along the printing cylinder in the forward direction.

The engraving stylus 4 of the engraving member 3 is controlled by an engraving signal G. The engraving signal G is formed in an engraving amplifier 8 by superimposing a periodic vibration signal R with image signal values B, which represent the tone values between "light" (white) and "dark" (black) of the cells that are to be engraved. While the periodic vibration signal R effectuates an oscillating lifting motion of the engraving stylus 4 for generating the engraving grid, the image signal values B in connection with the amplitude of the vibration signal R determine the geometric dimensions of the engraved cells such as cross-diagonals, longitudinal diagonals, gutter widths and channel width.

The image signal values B are obtained in a D/A converter 9 from engraving data GD, which are stored in an engraving data storage unit 10 and are read out of this line by line and fed to the D/A converter 9. Each engraving location for a cell is assigned an engraving datum in the engraving raster, which contains as engraving information the tone value between the tone values "light" and "dark" that is to be engraved.

The printing cylinder 1 is allocated an XY coordinate system, whose x axis is oriented in the axial direction and whose y axis is oriented in the circumferential direction of the printing cylinder 1. The x spatial coordinates of the engraving locations on the printing cylinder 1 that are arranged in the engraving raster are generated by the engraving carriage drive 7. A position transmitter 11 that is mechanically coupled to the cylinder drive 2 generates the corresponding y spatial coordinates of the engraving locations on the printing cylinder 1. The spatial coordinates (x,y) of the engraving locations are fed to a control unit 14 via lines 12,13.

The control unit 14 controls the addressing and readout of the engraving data GD from the engraving data storage unit 10 as a function of the xy coordinates of the current engraving locations via a line 15. The control unit 14 additionally generates the vibration signal R on a line 16 with the frequency required for generating the engraving raster.

For engraving test cells in a test engraving process that takes place prior to the actual engraving of the printing cylinder 1, the engraving machine comprises a test engraving computer 19, which delivers the required engraving data GD*, which represent the geometric desired dimensions of the test cells that are to be engraved, to the engraving amplifier 8 as digital/analog converted image signal values B.

To pick up a video image of the test cells that are generated in the test engraving process, a measurement carriage 20 that can be displaced in the axial direction of the printing cylinder 1 is provided with a video camera 21, which is connected via a line 22 to an image evaluating stage 23 for measuring the geometric actual dimensions of the test cells in the video image. The measurement carriage 20 can be moved automatically to the required axial measuring positions via spindle 24 by a measurement carriage drive 25. The measurement carriage 25 is controlled by the control unit 14 by a control command on a line 26. Alternatively, the video camera 21 can also be arranged in the region of the engraving member 3.

The geometric actual dimensions of the engraved test cells, which are detected in the image evaluation stage 23, are transferred via a line 27 to the test engraving computer 19) as measurement values M. In the test engraving computer 19, electrical settings E for the parameters "vibration", "light", "dark" and "medium gradation" are obtained by comparing the geometric actual dimensions to the predetermined geometric desired dimensions, and these settings are fed to the engraving amplifier 8 via a line 28. With the aid of the electrical setting values E, the vibration signal R and the engraving signal G are calibrated in the engraving amplifier 8 so that cells which are actually generated in the subsequent engraving of the printing cylinder 1 comprise the geometric desired dimensions that are required for an engraving process that is correct in terms of tone values. The calibration can be accomplished manually, but advantageously automatically by a dynamic control process, which can take place before or during the actual production of the printing form.

The calibration of the preferred embodiment with respect to the parameters "vibration", "light", "depth" and "medium gradation" comprises consecutive cycles or runs, where one run comprises the following steps [A] to [F]:

[A] input the electrical settings En for the individual parameters "vibration", "light", "dark" and "medium gradation" of a run (n),

[B] perform a test engraving with the inputted settings En,

[C] measure out the geometric actual dimensions of the engraved test cells,

[D] compare the geometric actual dimensions to the predetermined desired dimensions,

[E] ready transmission coefficients reproducing the relations between the variations of the electrical signal values and the resulting variations of the geometric dimensions of the engraved cells, and

[F] calculate difference values E from the geometric actual dimensions and the desired dimensions of the engraved test cells and the transmission coefficients, and calculate new settings for the subsequent run (n+1) from the difference values E according to the equation $E_{n+1} = E_n + \Delta E$.

The individual steps [A] to [F] of a run are detailed below.

Step A

In step [A] the electrical settings $E_R$, $E_L$, $E_T$ and $E_M$ for the individual parameters "vibration", "light", "dark" and "medium gradation" are input into the engraving amplifier 8, where the settings $E_R$ control the amplitude of the vibration signal R, the settings $E_L$ and $E_T$ control the engraving signal values $G_L$ and $G_T$ for "light" and "dark", and the settings $E_M$ control the engraving signal value $G_M$ for correcting a medium gradation.

In run I, the settings $E_1$ are generally experimental values; in the subsequent runs (n+1), they are the settings $E_{n+1}$ that are computed in the step [E] of the preceding run (n).

Step [B]

In step [B] a test engraving process is carried out using the settings $E_{Rn}$, $E_{Ln}$, $E_{Tn}$, and $E_{Mn}$ that were input in step [A]. To generate the test cells, the test engraving computer 19 calls the engraving data GD* for the desired values "dark", "light", and for at least one "medium gradation" between "light" and "dark", for example. The engraving data GD* represent the predetermined geometric desired dimensions of the test cells, for instance the desired cross-diagonals $d'_{QL}$, $d'_{QT}$, and $d'_{QM}$ as well as the width $d'_K$ of the penetration or channel in test engravings with the channel. The called engraving data GD* are converted into the engraving signal G for the engraving member 3. The engraving member 3 engraves at least one test cell 30 for "light" (L), "dark" (T) and "medium gradation" (M) on adjacent engraving lines 29. Advantageously, several identical test cells 30 are engraved on every engraving line 29, for instance across a selectable engraving line region.

Step [C]

In step [C] the video camera 21 records a video image of the engraved test cells 30 in order to measure out the geometric actual dimensions, namely the cross-diagonals $d''_{QL}$, $d''_{QT}$, $d''_{QM}$ and the width $d''_K$ of the penetration of the engraved test cells 30 for "light", "dark" and "medium gradation", with the aid of the video image in the image evaluation stage 23 and to route these to the test engraving computer 19 as measurement values M. A method for automatic evaluation of a video image for the purpose of determining the geometric dimensions of test cells is described in depth in WO 98/55302 A (PCT/DE 98/01441).

In Step [D]

In step [D] the geometric actual dimensions $d''_{QL}$, $d''_{QT}$, $d''_{QM}$ and $d'_K$ and the corresponding geometric desired dimensions $d'_{QL}$, $d'_{QT}$, $d'_{QM}$ and $d'_K$ are compared to one another, and it is decided with the aid of the comparison result whether another run is necessary for optimizing the calibration, or the calibration can be concluded already. The calibration is concluded either when the measured actual dimensions match the desired dimensions or when the actual dimensions achieved are within a predetermined tolerance range about the predetermined desired dimensions. Instead of the cross-diagonals $d''_{QL}$, $d''_{QT}$, $d''_{QM}$ of the cells, their longitudinal diagonals can also be observed.

Step [E]

In step [E] transmission coefficients "f" are made available, which account for the functional relations between the variations of electrical signal values $\Delta R$, $\Delta G_L$, $\Delta G_T$ and $\Delta G_M$ and the resulting variations of the geometric dimensions $\Delta d_{QL}$, $\Delta d_{QT}$, $\Delta d_{QM}$ and $\Delta d_K$ of the engraved cells. These functional relations are described below.

A modification of the vibration signal R for calibrating the parameter "vibration" influences the cross-diagonal $d_{QT}$ and the channel width $d_K$ of a cell representing the tone value "dark" according to the following relation (I):

$$\Delta(d_{QT}-d_K) = f(R) \times \Delta R \qquad (I)$$

In addition, a modification of the vibration signal R influences the cross-diagonals $d_{QL}$, $d_{QT}$ and $d_{QM}$ of the cells representing the tone values "light", "dark" and "medium gradation" according to the following relationships (II), (III) and (IV):

$$\Delta d_{QL}(R) = f_L(R) \times \Delta R \qquad (II)$$

$$\Delta d_{QT}(R) = f_T(R) \times \Delta R \qquad (III)$$

$$\Delta d_{QM}(R) = f_M(R) \times \Delta R \qquad (IV)$$

A modification of the engraving signal value $\Delta G_L$ for calibrating the parameter "light" influences the cross-diagonal $d_{QL}$ of a cell representing the tone value "light" according to the following relationship (V):

$$\Delta d_{QL} = 1/f(G_L) \times \Delta G_L \qquad (V)$$

In addition, a modification of the engraving signal value $G_L$ influences the cross-diagonal $d_{QM}$ of a cell representing the tone value "medium gradation" according to the following relation (VI):

$$\Delta d_{QM}(G_L) = f_M(G_L) \times \Delta G_L \qquad (VI)$$

Modification of the engraving signal value $G_T$ for calibrating the parameter "dark" influences the cross-diagonal $d_{QT}$ of a cell representing the tone value "depth" according to the following relation (VII):

$$\Delta d_{QT} = 1/f(G_T) \times \Delta G_T \qquad (VII)$$

In addition, modification of the engraving signal value $G_T$ influences the cross-diagonal $d_{QM}$ of a cell representing the tone value "medium gradation" according to the following relation (VIII):

$$\Delta d_{QM}(G_T) = f_M(G_T) \times \Delta G_T \qquad (VIII)$$

Correcting the medium gradation corrects the technical wear of the engraving stylus of an engraving member, which manifests itself namely by a reduced cell volume in cells representing a medium gradation. Modification of the engraving signal. $G_M$ for medium gradation correction influences the cross-diagonal $d_{QM}$ of a cell representing the medium gradation in accordance with the following relationship (IV):

$$\Delta d_{QM} = 1/f(G_M) \times \Delta G_M \qquad (IX)$$

Under the assumption made in the described exemplifying embodiment that the relationships are approximately linear, "f" is a coefficient of transmission, respectively. But in case the functional relations should not be linear, "f" can also be a respective transmission function. The given relationships are directly dependent on the type of signal processing. Based on a different signal processing process, the scope of the functional relationships can change.

The various coefficients of transmission f in the relations (I) to (IX), which reproduce the overall transmission function of the engraving machine between the electrical settings at the input side and the geometric dimensions of the engraved cells at the output side, are advantageously computed prior to calibration with the aid of test engravings and stored for later use in the test engraving computer 19.

Step [F]

In step [E], for the subsequent run (n+1) a new vibration signal value $R_{n+1}$ and new engraving signal values $G_{Ln+1}$, $G_{Tn+1}$, and $G_{Mn+1}$ for the individual parameters "vibration", "light", "dark" and "medium gradation" are calculated.

Parameter "Vibration"

First, upon consideration of relationship (I), a difference value $\Delta R$ for the vibration signal R is calculated from the measured actual dimensions $d''_{QT}$ and $d''_K$, the desired dimensions $d'_{QT}$ and $d'_K$ and the transmission coefficient $f(R)$ just calculated, in accordance with equation (X).

$$\Delta R = 1/f(R)[d'_{QT} - d'_K) - (d''_{QT} - d''_K)] \quad (X)$$

Next, the vibration signal value $R_{n+1}$ for the new run (n+1) is calculated from the difference value R that was calculated according to equation (X) and the vibration signal $R_n$ of the preceding run (n), in accordance with equation (XI).

$$R_{n+1} = R_n + \Delta R \quad (XI)$$

This vibration signal value $R_{n+1}$ is entered into the engraving amplifier 8 for a new run (n+1) by corresponding setting value $E_R$.

Parameter "Light"

First, a fictional cross-diagonal $d^*_{QL}$ is calculated as the sum of the measured cross-diagonals $d''_{QL}$ and a cross-diagonal variation $\Delta d_{QL}(R)$, which has arisen based on the variation $\Delta R$ of the vibration signal according to relation (II), in accordance with equation (XII).

$$d^*_{QL} = d''_{QL} + \Delta d_{QL}(R) \quad (XII)$$

With the aid of the fictional cross-diagonals $d^*_{QL}$, it is ascertained how to modify the engraving signal value $\Delta G_L$ in order to achieve the desired cross-diagonal $d'_{QL}$.

To do this, first the deviation $\Delta d_{QL}$ of the fictional cross-diagonals $d^*_{QL}$ from the desired cross-diagonals $d'_{QL}$ is calculated according to equation (XIII).

$$\Delta d_{QL} = d^*_{QL} - d'_{QL} \quad (XIII)$$

From the relation (V), the modification of the engraving signal value $\Delta G_L$ that is required for the correction of the deviation $\Delta d_{QL}$ is then calculated upon consideration of the previously calculated transmission coefficient $f(G_L)$, in accordance with equation (XIV).

$$\Delta G_L = f(G_L) \times \Delta d_{QL} \quad (XIV)$$

Thus the new engraving signal value $G_{Ln+1}$ for the run (n+1) derives in accordance with equation (XV).

$$G_{Ln+1} = G_{Ln} + \Delta G_L \quad (XV)$$

This engraving signal value $G_{Ln+1}$ is entered into the engraving amplifier 8 for a new run by a corresponding setting value $E_L$.

Parameter "Dark"

First, a fictional cross-diagonal $d^*_{QT}$ is calculated as the sum of the measured cross-diagonals $d''_{QT}$ and a cross-diagonal variation $\Delta d_{QT}(R)$, which has arisen based on the variation $\Delta R$ of the vibration signal according to relation (III), in accordance with equation (XVI).

$$d^*_{QT} = d''_{QT} + \Delta d_{QT}(R) \quad (XVI)$$

With the aid of the fictional cross-diagonals $d^*_{QT}$, it is ascertained how to modify the engraving signal value $\Delta G_T$ in order to achieve the desired cross-diagonal $d'_{QT}$.

To do this, first the deviation $\Delta d_{QT}$ of the fictive cross-diagonals $d^*_{QT}$ from the desired cross-diagonal $d'_{QT}$ is calculated according to equation (XVII).

$$\Delta d_{QT} = d^*_{QT} - d'_{QT} \quad (XVII)$$

From the relation (VII), the modification of the engraving signal value $G_T$ that is required for the correction of the deviation $d_{QT}$ is then calculated upon consideration of the previously calculated transmission coefficient $f(G_T)$, in accordance with equation (XVIII).

$$\Delta G_T = f(G_T) \times \Delta d_{QT} \quad (XVIII)$$

Thus the new engraving signal value $G_{Ln+1}$ for the run (n+1) derives in accordance with equation (IXX).

$$G_{Tn+1} = G_{Tn} + \Delta G_T \quad (IXX)$$

This engraving signal value $G_{Tn+1}$ is entered into the engraving amplifier 8 for a new run by a corresponding setting value $E_T$.

Parameter "Medium Gradation"

First, a fictional cross-diagonal $d^*_{QM}$ is calculated as the sum of the measured cross-diagonals $d''_{QM}$ and the cross-diagonal variations $\Delta d_{QM}(R)$, $\Delta d_{QM}(G_L)$ and $\Delta d_{QM}(G_T)$, in accordance with equation (XX). The cross-diagonal variations $d_{QM}(R), d_{QM}(G_L)$ and $d_{QM}(G_T)$ arise based on the modification R of the vibration signal $\Delta R$ in accordance with the relation (IV) and the variations $\Delta G_L$ and $\Delta G_T$ of the engraving signal values G, in accordance with the relations (VI) and (VIII).

$$d^*_{QM} = d''_{QM} + \Delta d_{QM}(R) + \Delta d_{QM}(G_L) + \Delta_{QM}(G_T) \quad (XX)$$

With the aid of the fictional cross-diagonals $d^*_{QM}$, it is ascertained how to modify the engraving signal value $\Delta G_M$ in order to achieve the desired cross-diagonal $d'_{QM}$.

To do this, first the deviation $\Delta d_{QM}$ of the fictional cross-diagonals $d^*_{QM}$ from the desired cross-diagonals $d'_{QM}$ is calculated according to equation (XXI).

$$\Delta d_{QM} = d^*_{QM} - d'_{QM} \quad (XXI)$$

From the relation (IV), the modification of the engraving signal $\Delta G_M$ that is required for the correction of the deviation $\Delta d_{QM}$ is then calculated upon consideration of the previously calculated transmission coefficient $f(G_M)$, in accordance with equation (XXII):

$$\Delta G_M = f(G_M) \times \Delta d_{QM} \quad (XXII)$$

Thus the new engraving signal value $G_{Mn+1}$ for the run (n+1) derives in accordance with equation (XXIII):

$$G_{Mn+1} = G_{Mn} + \Delta G_M \quad (XXIII)$$

This engraving signal value $G_{Mn+1}$ is entered into the engraving amplifier 8 for a new run by a corresponding setting value $E_M$.

The individual runs are repeated while maintaining the transmission coefficients f until it is ascertained either that the measured actual dimensions match the desired dimensions or that the actual dimensions achieved are within a predetermined tolerance range about the predetermined desired dimensions.

In order to reduce the number of individual runs and thus achieve a more rapid calibration, it is suggested to determine the differences between the desired dimensions $d'_{QT}$, $d'_{QL}$, $d'_{QM}$ and $d'_K$ and the respectively achieved actual dimensions $d''_{QT}$, $d''_{QL}$, $d''_{QM}$ and $d''_K$ in step [D], at least within one run (n), preferably within the second run II, and, if the differences are greater than a predetermined tolerance range below the desired dimensions, to compute improved transmission coefficients f in step [E] in the sense of a more rapid approximating of the desired dimensions by the actual dimensions, and then in step [F] to calculate a corrected vibration signal value $R_{n+1}$ and corrected engraving signal values $G_{Ln+1}$ $G_{Tn+1}$ and $G_{Mn+1}$ for the subsequent run (n+1) with the aid of the new transmission coefficients f', in order to achieve a fast calibration. The improved transmission coefficients f' can be stored and used advantageously for a later calibration prior to the engraving of a new printing cylinder 1.

The determining of the improved transmission coefficients f', which reproduce relations between the adjusted electrical settings $E_n$ ($R_n$, $G_{Ln}$, $G_{Tn}$, $G_{Mn}$) and the measured geometric dimensions $d''_n$($d''_{QL}$, $d''_{QT}$, $d''_{QM}$, $d''_K$), is accomplished by difference formation between the settings $E_n$ and $E_{n+1}$ and by difference formation between the measured geometric dimensions $d_n$ and $d_{n+1}$ of two consecutive runs (n) and (n+1) by the following general schema:

| run n: | setting $E_n$ | =>f=>measured dimensions $d''_n$ |
| run (n + 1): | setting $E_{n+1}$ | =>f=>measured deviations $d''_{n+1}$ |

Difference formation $\Delta(e_m - E_{n+1}) \Rightarrow f \Rightarrow \Delta(d''_n - d''_{n+1})$ The calculation of an improved transmission coefficient f□ is described further in the example of the parameter "vibration".

A first vibration signal value $R_I$ which is entered in the first run I yields the geometric dimensions $d_{QTI}$ and $d_{KI}$ in the first measurement. A second vibration signal value $R_{II}$, which is entered in the second run II yields the geometric dimensions $d_{QTII}$ and $d_{KII}$ in the second measurement. Upon difference formation, the improved transmission coefficient f□ for the parameter "vibration" can be calculated in accordance with equation (XIV), given known R and known geometric dimensions:

$$\Delta R = (R_{II} - R_I) = f'[(d''_{QTII} - d''_{QTI}) - (d''_{KII} - d''_{KI})] \quad (XIV)$$

Improved transmission coefficients f' are determined analogously for the other parameters "light", "dark", and "medium gradation".

Although various minor changes and modifications might be proposed by those skilled in the art, it will be understood that my wish is to include within the claims of the patent warranted hereon all such changes and modifications as reasonably come within my contribution to the art.

I claim as my invention:

1. A method for calibrating an engraving amplifier in an electronic engraving machine for engraving printing cylinders for gravure printing, comprising the steps of:

acquiring an engraving signal for actuating an engraving stylus of an engraving member from engraving signal values derived from engraving data representing desired tone values and a periodic vibration signal in an engraving amplifier that can be adjusted by setting electrical signal values corresponding to electrical settings for generating an engraving raster, said electrical signal values modifying at least one of the parameters "vibration", "light", "dark", and "medium gradation";

with the engraving stylus, engraving cells into the printing cylinder, the actual dimensions of the cells representing engraved actual tone values;

calculating transmission functions adjusted at the engraving amplifier which reproduce relationships between variations of the electrical signal values and resulting variations of geometric actual dimensions of the engraved cells;

with the electrical signal values, engraving test cells for predetermined desired tone values corresponding to desired dimensions, and measuring their geometric actual dimensions;

calculating difference values from the actual dimensions and the desired dimensions of the cells and by use of the transmission functions;

correcting the electrical signal values by adding the difference values;

the steps of engraving test cells and connecting the electrical signal values are repeated until the actual dimensions of the test cells are at least within a tolerance range about the desired dimensions, and to shorten calibration time, in each sequence of the steps from setting the electrical signal values through correcting the electrical signal values, comparing the actual dimensions of the cells to the desired dimensions;

if the actual dimensions are outside the tolerance range, recalculating the transmission functions;

computing new difference values by use of the recalculated transmission functions; and correcting the electrical signal values using the new difference values.

2. The method of claim 1 wherein the recalculation of new transmission functions respectively occurs by difference formation between the corrected electrical signal values and by difference formation between the functionally corresponding actual dimensions of the cells of two successive sequences from the step of setting the electrical signal values to the step of correcting the electrical signal values.

3. The method of claim 1 wherein the dimension of a cell is a cross-diagonal, a longitudinal diagonal and channel width.

4. The method of claim 1 wherein the difference value of the vibration signal value for the parameter "vibration" is computed from a difference between the actual dimensions and the desired dimensions of a test cell representing a tone value "dark."

5. The method of claim 1 wherein a fictional cross-diagonal for a test cell represents the tone value parameter "light" as a sum of measured cross-diagonals and a cross-diagonal variation which arises owing to a variation of the vibration signal;

a deviation of the fictional cross-diagonals from desired cross-diagonals is computed; and a difference value of the engraving electrical signal value for the parameter "light" is computed from the determined deviation and the transmission function which represents the relationship between a variation of the engraving electrical signal value for the parameter "light" and the resulting variation of the cross-diagonals of the test cell representing the tone value domain "light".

6. The method of claim 1 wherein a fictional cross-diagonal for a cell representing the tone value domain "dark" is determined as a sum of the measured cross-diagonals and a cross-diagonal variation that occurs owing to the variation of the vibration signal;

the deviation of the fictional cross-diagonals from the desired cross-diagonals is determined; and the difference value of the engraving signal value for the parameter "dark" is computed from the determined deviation and the transmission function, which reproduces a relationship between a variation of the engraving signal value for the parameter "dark" and a resulting variation of the cross-diagonals of a test cell representing the tone value domain "dark".

7. The method of claim 1 wherein
a fictional cross-diagonal for a test cell representing the tone value parameter "medium gradation" is computed as a sum of the measured cross-diagonals and cross-diagonal variations that occur owing to the variation of the vibration signal;
a deviation of the fictional cross-diagonals from the desired cross-diagonals is determined, and
a difference value of the engraving electrical signal value for the parameter "medium gradation" is computed from the determined deviation and the transmission function, which reproduces a relationship between a variation of the engraving electrical signal value for the parameter "medium gradation" and the resulting variation of the cross-diagonals of the cell representing the tone value domain "medium gradation."

8. The method of claim 1 wherein
the relationships between the electrical signal values and the actual measurements of the engraved test cells are approximately linear; and
the relationships are defined by transmission coefficients.

9. The method of claim 1 wherein the electrical signal values that are set for the first sequence from the step of setting the electrical signal values to the step of correcting the electrical signal values are experimental values.

\* \* \* \* \*